United States Patent
Xiao et al.

(10) Patent No.: US 9,008,163 B2
(45) Date of Patent: Apr. 14, 2015

(54) VECTORED-DSL METHOD AND SYSTEM, BOARD, AND DSLAM DEVICE

(71) Applicant: Huawei Technologies Co., Ltd., Shenzhen (CN)

(72) Inventors: Ruijie Xiao, Shenzhen (CN); Huishen Dong, Shenzhen (CN); Cheng Li, Chengdu (CN); Jinxiong Lv, Shenzhen (CN); Jianwei Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/082,398

(22) Filed: Nov. 18, 2013

(65) Prior Publication Data
US 2014/0079105 A1   Mar. 20, 2014

Related U.S. Application Data

(63) Continuation of application No. PCT/CN2011/074253, filed on May 18, 2011.

(51) Int. Cl.
*H04B 1/38* (2006.01)
*H04M 3/00* (2006.01)
(Continued)

(52) U.S. Cl.
CPC ............ *H04M 3/007* (2013.01); *H04M 11/062* (2013.01); *H04B 3/32* (2013.01); *H04L 12/2896* (2013.01)

(58) Field of Classification Search
CPC .......... H04B 1/00; H04B 3/32; H04J 3/0638; H04L 1/0002; H04L 1/0054; H04L 1/20; H04L 1/205; H04L 2025/03363; H04L 2025/0349; H04L 2025/03509; H04L 25/03038; H04L 25/085; H04L 25/14; H04L 25/497

USPC ......... 375/219, 220, 222, 229, 230, 259, 268, 375/271, 286, 295, 298, 302, 316, 318, 322, 375/338, 341, 342, 346
See application file for complete search history.

(56) References Cited

U.S. PATENT DOCUMENTS

2001/0004383 A1  6/2001  Nordstrom et al.
2006/0280238 A1  12/2006  Cioffi et al.
(Continued)

FOREIGN PATENT DOCUMENTS

CN      101047459    10/2007
CN      101136659    3/2008
(Continued)

OTHER PUBLICATIONS

International Search Report, dated Jan. 3, 2012, in corresponding International Application No. PCT/CN2011/074253 (6 pp.).
(Continued)

*Primary Examiner* — Hirdepal Singh
(74) *Attorney, Agent, or Firm* — Staas & Halsey LLP

(57) ABSTRACT

A vectored-DSL method and system and a board relate to the field of digital subscriber line DSL data processing, so as to increase user capacity of a vectored-DSL system. The vectored-DSL method includes: receiving, by at least one board, and pre-processing user data of the board; transmitting, by the board, the user data of the board to an auxiliary vector processor on the board to perform internal vectorization processing, so as to obtain internally processed data; transmitting, by the board, the user data thereof to a centralized vector processor to perform external vectorization processing, so as to obtain externally processed data; and receiving, by the board, the externally processed data of the board, and post-processing the externally processed data and the internally processed data.

13 Claims, 7 Drawing Sheets

(51) Int. Cl.
    *H04M 11/06*    (2006.01)
    *H04B 3/32*     (2006.01)
    *H04L 12/28*    (2006.01)

(56)         References Cited

U.S. PATENT DOCUMENTS

| | | | |
|---|---|---|---|
| 2008/0298555 A1* | 12/2008 | Duvaut et al. | 379/3 |
| 2009/0147666 A1 | 6/2009 | Fang et al. | |
| 2010/0034374 A1 | 2/2010 | Oehman et al. | |
| 2010/0220823 A1 | 9/2010 | Biyani et al. | |
| 2010/0329386 A1* | 12/2010 | De Lind Van Wijngaarden | 375/296 |
| 2012/0020418 A1* | 1/2012 | Sands et al. | 375/259 |
| 2012/0093241 A1* | 4/2012 | Singh et al. | 375/257 |
| 2012/0147932 A1* | 6/2012 | Wilkes et al. | 375/219 |
| 2012/0195183 A1* | 8/2012 | Nuzman et al. | 370/201 |
| 2013/0051488 A1* | 2/2013 | Shridhar et al. | 375/285 |
| 2013/0101093 A1* | 4/2013 | Tennyson et al. | 379/28 |

FOREIGN PATENT DOCUMENTS

| | | |
|---|---|---|
| CN | 101166130 | 4/2008 |
| WO | WO2009/152188 | 12/2009 |

OTHER PUBLICATIONS

Written Opinion, dated Jan. 3, 2012, in corresponding International Application No. PCT/CN2011/074253 (3 pp.).

Office Action, dated Jan. 16, 2013, in corresponding Chinese Application No. 201180000602.1 (6 pp.).

\* cited by examiner

VECTORED-DSL METHOD AND SYSTEM, BOARD, AND DSLAM DEVICE

CROSS-REFERENCE TO RELATED APPLICATIONS

This application is a continuation of International Application No. PCT/CN2011/074253, filed on May 18, 2011, which is hereby incorporated by reference in its entirety.

TECHNICAL FIELD

Embodiments of the present invention relate to the field of digital subscriber line DSL data processing, and in particular, to a vectored-DSL method and system, a board, and a DSLAM device.

BACKGROUND xDSL is a generic name of various DSLs (Digital Subscriber Line, digital subscriber line), and xDSL is transmission technology to transmit high-speed data in a telephone twisted pair (that is, unshielded twist pair, Unshielded Twist Pair, UTP for short). At a central office (CO, Central Office) of an xDSL system, a device, DSLAM (Digital Subscriber Line Access Multiplexer, DSL access multiplexer), providing access of multichannel xDSL signals exists.

Due to existence of the phenomenon of electromagnetic induction, multichannel signals accessed by the DSLAM interfere with each other, which is called crosstalk (Crosstalk). As shown in FIG. 1, two kinds of crosstalk exist: near-end crosstalk (NEXT, Near-end crosstalk) and far-end crosstalk (FEXT, Far-end crosstalk). Uplink and downlink channels of an xDSL adopts frequency division multiplexing, so that the NEXT does not harm system performance badly, but the FEXT seriously affects transmission performance of the line. For example, when multiple users in a bundle of cables all need to subscribe to an xDSL service, the FEXT may result in problems such as low rates and unstable performance of some lines and even failure in subscription. In order to eliminate the FEXT, currently the industry proposes a vectored-DSL (Vectored-DSL) technology, and the technology mainly uses a joint receiving and transmission function of the DSLAM and uses a signal processing method to eliminate FEXT interference.

As shown in FIG. 2, for an uplink direction, the CO performs signal joint receiving processing. First, it is assumed that signals sent by K users form a channel input vector, which is a K×1 column vector $x=(x_1, x_2, \ldots, x_k)^T$; a transmission channel H represents a crosstalk channel between DSLs on a subcarrier of a frequency domain, H is a K×K channel transmission matrix, and an expression is as follows:

$$H = \begin{bmatrix} h_{11} & h_{12} & \ldots & h_{1K} \\ h_{21} & h_{22} & \ldots & h_{2K} \\ \vdots & \vdots & \ddots & \vdots \\ h_{K1} & h_{K2} & \ldots & h_{KK} \end{bmatrix}_{K \times K}$$

(Formula 1)

where $h_{ij}$ represents a transmission equation from a channel j to a channel i. Further, b is used to represent a K×1 noise vector, and is a K×1 column vector; Y represents a channel output vector, and is a K×1 column vector. An expression of the channel output vector Y is as follows:

$$y = Hx + b$$ (Formula 2).

In order to eliminate crosstalk, signal joint receiving processing is performed at the CO, a crosstalk elimination processor is introduced to a receiver, the crosstalk elimination processor generates a K×K crosstalk elimination matrix W, W makes WH be a diagonal matrix, and then processing is performed on the signal output vector y according to Formula 3, so as to obtain a processed channel output vector ŷ;

$$\hat{y} = WHx + Wb$$ (Formula 3).

As WH is a diagonal matrix, the crosstalk can be eliminated.

As shown in FIG. 3, for a downlink direction, signal joint sending processing is performed at the CO. Similarly, it is assumed that there are K users, the CO needs to send signals to the K users to form a K×1 column vector x; in order to eliminate transmission channel crosstalk, a vector precoding processor is introduced to the CO, the vector precoding processor generates a K×K precoding matrix P, P makes HP be a diagonal matrix, and in this case, the sent signals are x̂ which has an expression as follows:

$$\hat{y} = Px$$ (Formula 4).

A signal received by a receiving unit of the user is:

$$\hat{y} = HPx + b$$ (Formula 5).

Because HP is a diagonal matrix, the crosstalk can be eliminated.

Based on the aforementioned principle, the prior art proposes a centralized vectored-DSL system. As shown in FIG. 4, the system includes N boards, each board controls n users, and user data of all boards is all transmitted to a centralized vector processor to perform data processing to eliminate crosstalk. The centralized vector processor has functions of both a crosstalk elimination processor and a vector precoding processor.

For an uplink direction, each board sends data of n users, which passes through a first data processing unit, to the centralized vector processor, so that the centralized vector processor receives data Hx of all N*n users, Hx is an (N*n)×1 column vector; the centralized vector processor generates an (N*n)×(N*n) crosstalk elimination matrix W, the centralized vector processor needs to perform calculation of W*Hx, and since components of each vector are plural, $4(N*n)^2$ multiplication operations and $3(N*n)^2-(N*n)$ addition operations are required to be performed in the process; then, the centralized vector processor returns the processed data to the corresponding board, and subsequent data processing is performed.

For a downlink direction, the centralized vector processor generates a precoding matrix P, and performs a vector operation of P*x. Similarly, $4(N*n)^2$ multiplication operations and $3(N*n)^2-(N*n)$ addition operations are also required to be performed.

Using of the vectored-DSL technology to perform precoding and crosstalk elimination has high real-time requirements, so that when an existing centralized vectored-DSL system is used, a centralized vector processor is required to be able to process user data on all boards in real time, thereby requiring the centralized vector processor to have very high data processing capability. Because the number of users increases, the data processing capability requirement on the centralized vector processor increases. The data processing capability of the existing centralized vector processor limits user capacity of a vectored-DSL system.

SUMMARY

Embodiments of the present invention provide a vectored-DSL method and system, a board, and a DSLAM device, so as to increase user capacity of a vectored-DSL system.

In order to achieve the objective, the embodiments of the present invention adopt the following technical solution.

A vectored-DSL method includes:

receiving and pre-processing, by at least one board, user data of the board;

transmitting, by the board, the user data of the board to an auxiliary vector processor on the board to perform internal vectorization processing, so as to obtain internally processed data;

transmitting, by the board, the user data thereof to a centralized vector processor to perform external vectorization processing, so as to obtain externally processed data; and receiving, by the board, the externally processed data of the board, and post-processing the externally processed data and the internally processed data.

A board includes:

a pre-processing unit, configured to receive and pre-process user data of the board;

a first transmitting unit, configured to transmit the user data of the board to an auxiliary vector processor on the board;

the auxiliary vector processor, configured to perform internal vectorization processing on the user data of the board and output internally processed data;

a first receiving unit, configured to receive the internally processed data output by the auxiliary vector processor;

a second transmitting unit, configured to transmit the user data of the board to a centralized vector processor to perform external vectorization processing;

a second receiving unit, configured to receive externally processed data output after the centralized vector processor performs the external vectorization processing; and a post-processing unit, configured to post-process the internally processed data from the first receiving unit and the externally processed data from the second receiving unit.

A digital subscriber line access multiplexer DSLAM device includes at least two boards, and at least one of the boards includes:

a pre-processing unit, configured to receive and pre-process user data of the board;

a first transmitting unit, configured to transmit the user data of the board to an auxiliary vector processor on the board;

the auxiliary vector processor, configured to perform internal vectorization processing on the user data of the board and output internally processed data;

a first receiving unit, configured to receive the internally processed data output by the auxiliary vector processor;

a second transmitting unit, configured to transmit the user data of the board to a centralized vector processor to perform external vectorization processing;

a second receiving unit, configured to receive externally processed data output after the centralized vector processor performs the external vectorization processing; and a post-processing unit, configured to post-process the internally processed data from the first receiving unit and the externally processed data from the second receiving unit.

A vectored-DSL system includes a DSLAM device; the DSLAM device includes at least two boards, at least one of the boards includes an auxiliary vector processor, the auxiliary vector processor is configured to perform internal vectorization processing on user data of the board where the auxiliary vector processor is located, and the user data of the board including the auxiliary processor undergoes external vectorization processing performed by a centralized vector processor.

The centralized vector processor is configured to perform the external vectorization processing on the user data of the board that includes the auxiliary vector processor, and perform the internal vectorization processing and the external vectorization processing on user data of a board that does not include the auxiliary vector processor.

In a vectored-DSL method and system, a board, and a DSLAM device provided by the embodiments of the present invention, an auxiliary vector processor is disposed on at least one board, the auxiliary vector processor performs internal vectorization processing on user data of the board where the auxiliary vector processor is located, and a centralized vector processor performs external vectorization processing on the user data of the board; the auxiliary vector processor shares a partial amount of data processing, so that in a situation in which the number of system users remains unchanged, an amount of data processing of the centralized vector processor may be decreased, and in a situation in which data processing capability of the centralized vector processor remains unchanged, user capacity of a vectored-DSL system may be increased; definitely, if the data processing capability of the centralized vector processor can be improved, application of the solution provided by the present invention may further increase the user capacity of the vectored-DSL system.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
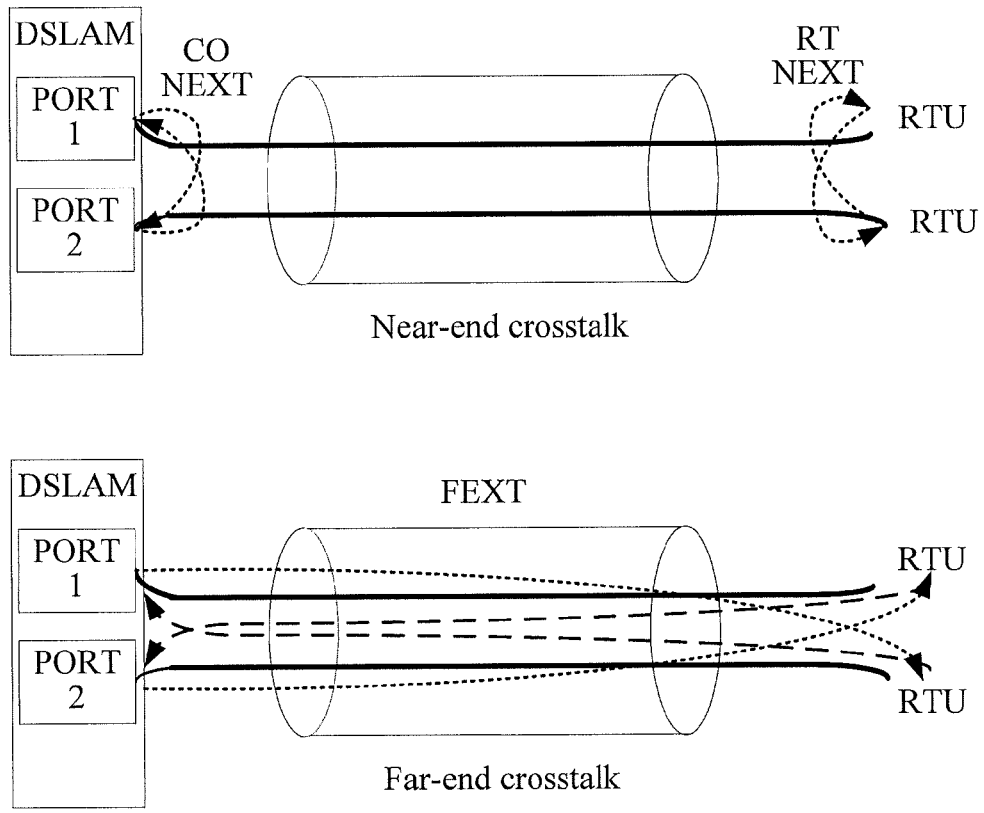
FIG. 1 is a schematic diagram of near-end crosstalk and far-end crosstalk.
Figure 2:
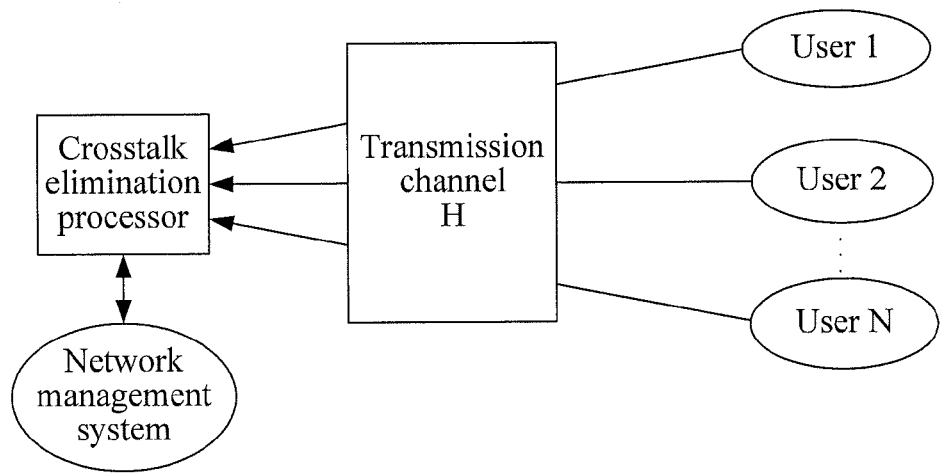
FIG. 2 is a schematic diagram in which a user transmits uplink data to a CO.
Figure 3:
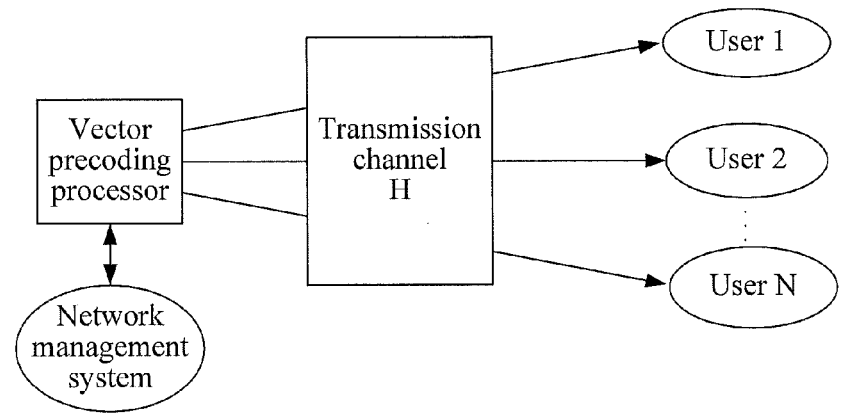
FIG. 3 is a schematic diagram in which a CO transmits downlink data to a user.
Figure 4:
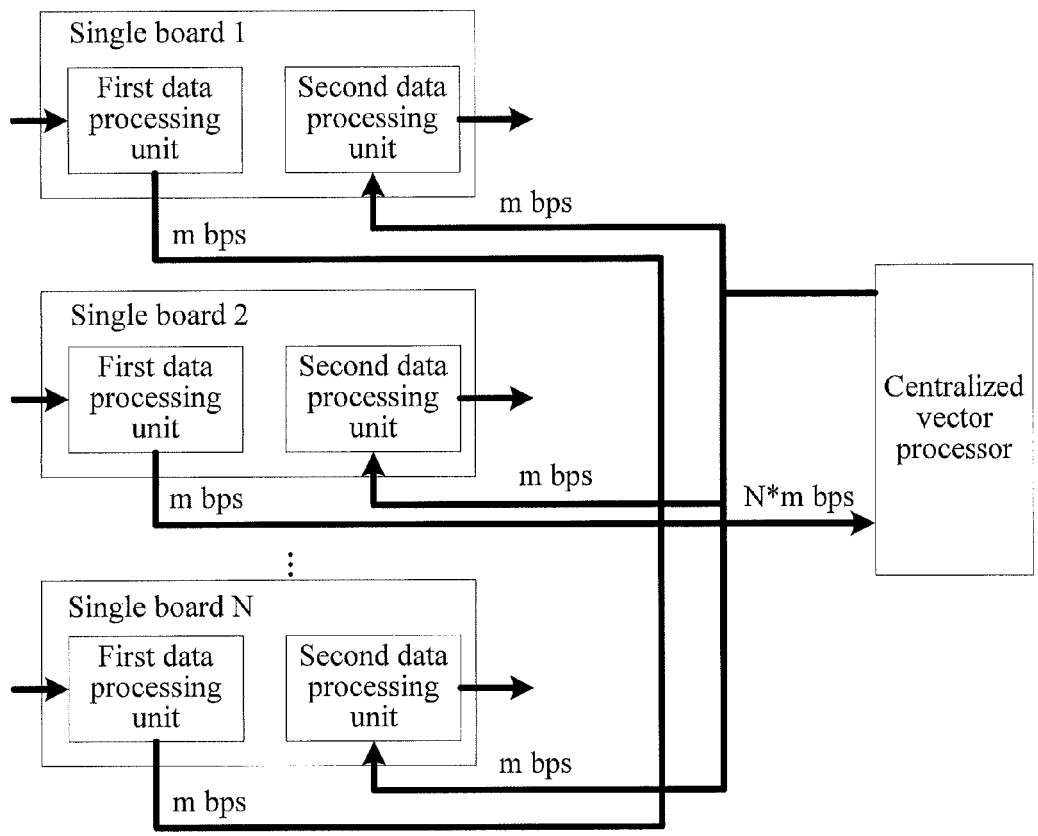
FIG. 4 is a schematic diagram of a centralized vectored-DSL system provided by the prior art.
Figure 5:
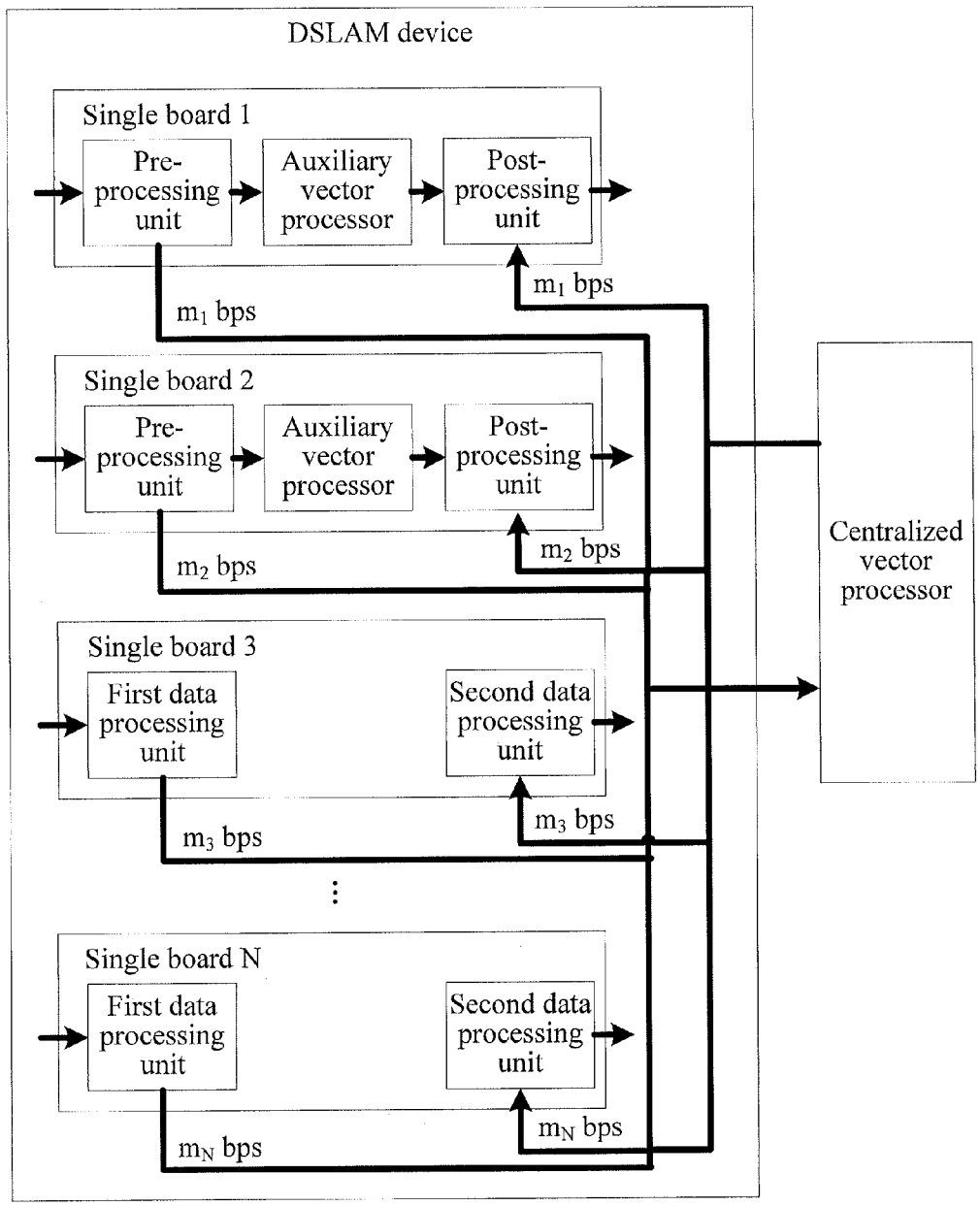
FIG. 5 is a schematic diagram of a vectored-DSL system provided by Embodiment 1.

As shown in FIG. 5, the embodiment of the present invention provides a vectored-DSL system, which includes a DSLAM device. The DSLAM device includes at least two boards, at least one of the boards includes an auxiliary vector processor, the auxiliary vector processor is configured to perform internal vectorization processing on user data of the board where the auxiliary vector processor is located, and the user data of the board that includes the auxiliary processor undergoes external vectorization processing performed by a centralized vector processor.

The centralized vector processor is configured to perform the external vectorization processing on the user data of the board that includes the auxiliary vector processor, and perform the internal vectorization processing and the external vectorization processing on user data of a board that does not include the auxiliary vector processor.

The centralized vector processor is disposed in the DSLAM device, or is independent of the DSLAM device. FIG. 5 illustrates an example where the centralized vector processor is independent of the DSLAM device, but a location of the centralized vector processor is not limited to what is shown in FIG. 5, and for example, the centralized vector processor may be made into a boarded inserted in a slot of the DSLAM device.

Figure 6:
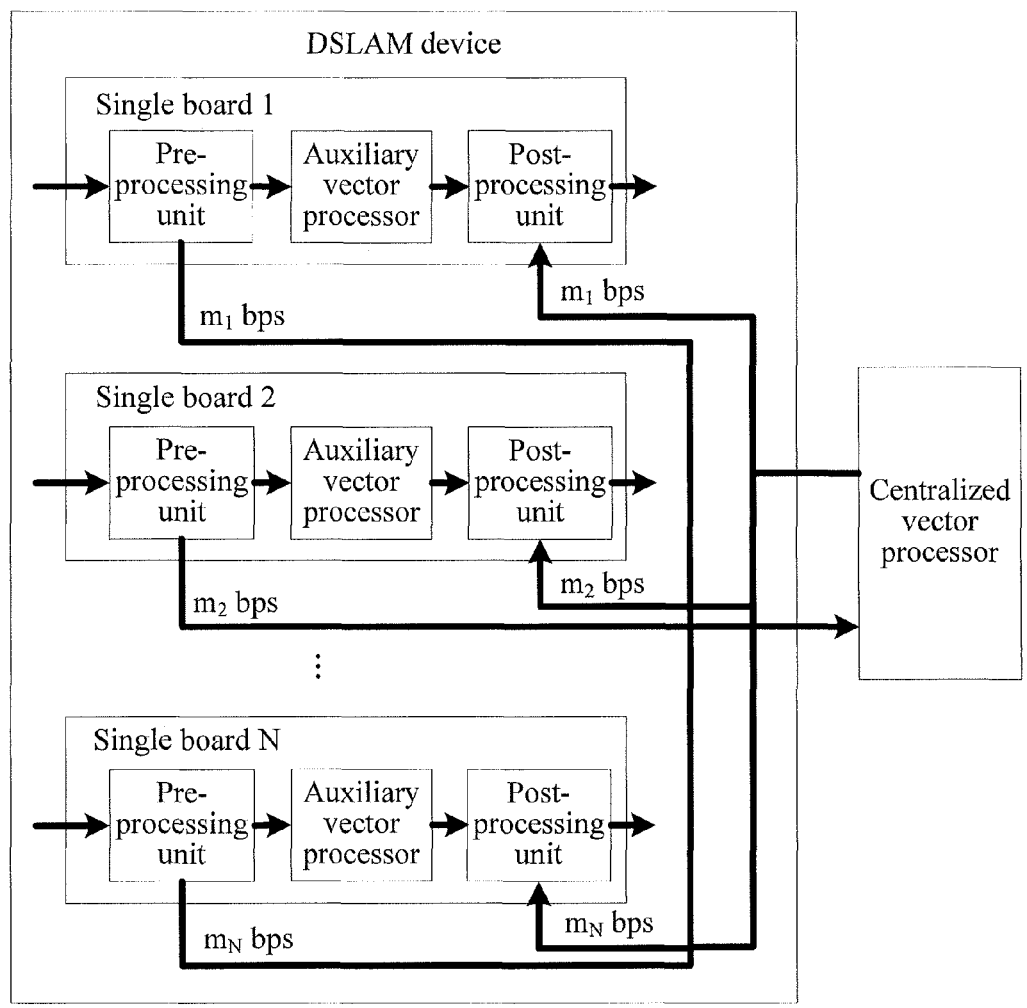
FIG. 6 is a schematic diagram of another vectored-DSL system provided by Embodiment 1.

In this embodiment, the number of the boards in the DSLAM device is N (N≥2), which are a board 1, a board 2, . . . , and a board N. The number of users of each board is n (n≥2), and users of the board 1 are $X_1$–$X_n$, users of the board 2 are $X_{n+1}$–$X_{2n}$ . . . , and users of the board N are $X_{(N-1)n+1}$–$X_{Nn}$. It is only required that at least one boards among the N boards includes an auxiliary vector processor. The vectored-DSL system shown in FIG. 5 is an example that the board 1 and the board 2 each include an auxiliary vector processor. A vectored-DSL system shown in FIG. 6 is an optimal situation, where each board of the vectored-DSL system includes an auxiliary vector processor. Because the number of auxiliary vector processors increases, a shared amount of data processing increases, so that in a situation in which data processing capability of the centralized vector processor remains unchanged, user capacity of the vectored-DSL system increases.

The vectorization processing includes precoding and/or crosstalk elimination.

For a situation in which a user transmits uplink data to a CO, the vectorization processing refers to crosstalk elimination performed on uplink user data. In this situation, the internal vectorization processing refers to crosstalk elimination performed by the auxiliary vector processor on each board to eliminate crosstalk incurred between users on the board, and in this case, the internal vectorization processing is also called internal crosstalk elimination; the external vectorization processing refers to crosstalk elimination performed by the centralized vector processor to eliminate crosstalk incurred between a user of each board and users of other boards, and in this case, the external vectorization processing is also called external crosstalk elimination. For example, for the board 1, the internal vectorization processing refers to crosstalk elimination performed to eliminate crosstalk incurred between the users $X_1$–$X_n$, and the external vectorization processing refers to crosstalk elimination performed to eliminate crosstalk incurred between the users $X_1$–$X_n$ and users on other boards.

Further, for a CO that transmits downlink data to a user, the vectorization processing refers to precoding performed on downlink user data. In this situation, the internal vectorization processing refers to precoding performed by the auxiliary vector processor on each board to eliminate crosstalk incurred between users on the board, and in this case, the internal vectorization processing is also called internal precoding; the external vectorization processing refers to precoding performed by the centralized vector processor to eliminate crosstalk incurred between a user of each board and users of other boards, and in this case, the external vectorization processing is also called external precoding. For example, for the board 1, the internal vectorization processing refers to precoding performed to eliminate crosstalk that may be incurred between the users $X_1$–$X_n$, and the external vectorization processing refers to precoding performed to eliminate crosstalk that may be incurred between the users $X_1$–$X_n$ and users of other boards.

It should be noted that, for a board, not including the auxiliary processor, of the vectored-DSL system, both internal vectorization processing and external vectorization processing of user data of the board are performed by the centralized vector processor.

In the vectored-DSL system provided by the present invention, the auxiliary vector processor on each board shares a partial amount of data processing, so that in a situation in which the number of system users remains unchanged, an amount of data processing of the centralized vector processor may be decreased, and in a situation in which data processing capability of the centralized vector processor remains unchanged, user capacity of the vectored-DSL system may be increased.

In this embodiment, in order to decrease the data transmission bandwidth between a board and the centralized vector processor, the board that includes the auxiliary vector processor may further be configured to select a user that is on the board and is in strong line-correlation with users of other boards, and transmit data of the user that is on the board and is in strong line-correlation with the user on other boards to the centralized vector processor.

In this embodiment, an explanation of strong line-correlation is as follows:

During data transmission (including data uplink transmission and data downlink transmission) performed between a CO and users through lines, if a line of a user incurs crosstalk to data transmitted on a line of another user, the two users are in strong line-correlation. For example, if lines the user $X_1$ on the board 1 and any user $X_i$ (n+1≤i≤N*n) of other boards incur crosstalk, the users $X_1$ and $X_i$ are in strong line-correlation. If lines of n1 (n1≤n) users of the board 1, for example, $X_1$–$X_{n1}$ and any user $X_i$ (n+1≤i≤N*n) of other boards may incur crosstalk, the users that are on the board 1 and in strong line-correlation with the user of the other boards are $X_1$–$X_{n1}$, and data of the users that are on the board 1 and in strong line-correlation with the user of the other boards is data of the users $X_1$–$X_{n1}$.

The selection of the user that is on the board and is in strong line-correlation with the user on the other boards may be implemented by the board according to an empirical value or in other manners.

A selection function of the board may also be implemented by the centralized vector processor. The centralized vector processor is further configured to select a user, which is in strong line-correlation with users of other boards, on each board that includes the auxiliary vector processor, and control the board where the user is located to transmit user data of the user to the centralized vector processor.

If the centralized vector processor is disposed on the DSLAM device, the centralized vector processor may be integrated on any board among the at least two boards, and definitely, the centralized vector processor may also be independent of the at least two boards and exist separately.

In the embodiment of the present invention, data transmitted between the board and the centralized vector processor may be data of the user, which is in strong line-correlation with the users of other boards, on each board, that is, may be partial user data of each board, thereby reducing use of the data transmission bandwidth.

Figure 7:
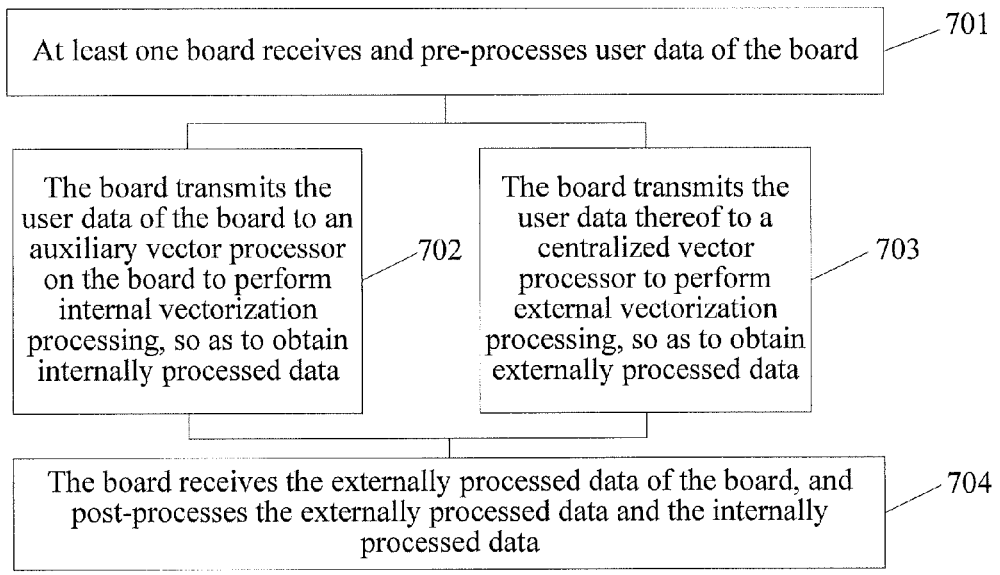
FIG. 7 is a schematic diagram of a vectored-DSL method provided by an embodiment of the present invention.

Based on the vectored-DSL system, this embodiment further provides a vectored-DSL method. As shown in FIG. 7, the method includes the following steps:

701: At least one board receives and pre-processes user data of the board.

The method of this embodiment is for a board including an auxiliary vector processor, that is, the at least one board refers to at least one board that includes an auxiliary vector processor. A processing method of user data of a board that does not include an auxiliary vector processor is the same as that in the prior art in which a centralized vector processor performs internal vectorization processing and external vectorization processing on user data of the board, and is therefore not repeated herein.

702: The board transmits the user data of the board to an auxiliary vector processor on the board to perform internal vectorization processing, so as to obtain internally processed data.

703: The board transmits the user data thereof to a centralized vector processor to perform external vectorization processing, so as to obtain externally processed data.

704: The board receives the externally processed data of the board, and post-processes the externally processed data and the internally processed data.

The vectorization processing includes precoding and/or crosstalk elimination.

In the vectored-DSL method provided by the present invention, the auxiliary vector processor on at least one board shares a partial amount of data processing, so that in a situation in which the number of system users remains unchanged, an amount of data processing of the centralized vector processor may be decreased, and in a situation in which data processing capability of the centralized vector processor remains unchanged, user capacity of a vectored-DSL system may be increased; definitely, if the data processing capability of the centralized vector processor can be improved, application of the solution provided by the present invention may further increase the user capacity of the vectored-DSL system.

Figure 8:
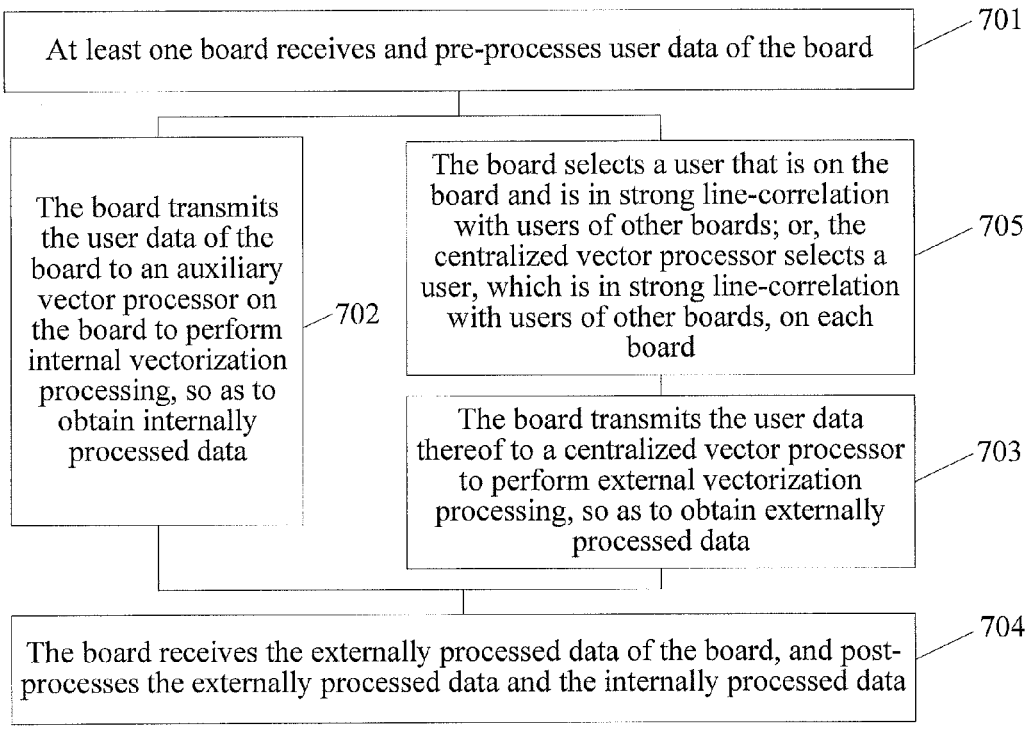
FIG. 8 is a schematic diagram of another vectored-DSL method provided by an embodiment of the present invention.

Preferably, in order to decrease the data transmission bandwidth between the board and the centralized vector processor, as shown in FIG. 8, before step 703, the following is further included.

Step 705: The board selects a user that is on the board and is in strong line-correlation with users of other boards; or, the centralized vector processor selects a user that is on the board and is in strong line-correlation with users of other boards.

In this case, step 703 may specifically be that the board transmits data of the user that is on the board and is in strong line-correlation with the user on other boards to the centralized vector processor to perform the external vectorization processing, so as to obtain the externally processed data.

The data transmitted by the at least one board to the centralized vector processor may be partial user data of the board, thereby achieving the objective of saving the bandwidth. Definitely, in a situation in which all user data of some boards is not very large, the preferred manner many not be selected, and all user data of the board is still transmitted to the centralized vector processor.

Embodiment 2

Figure 9:
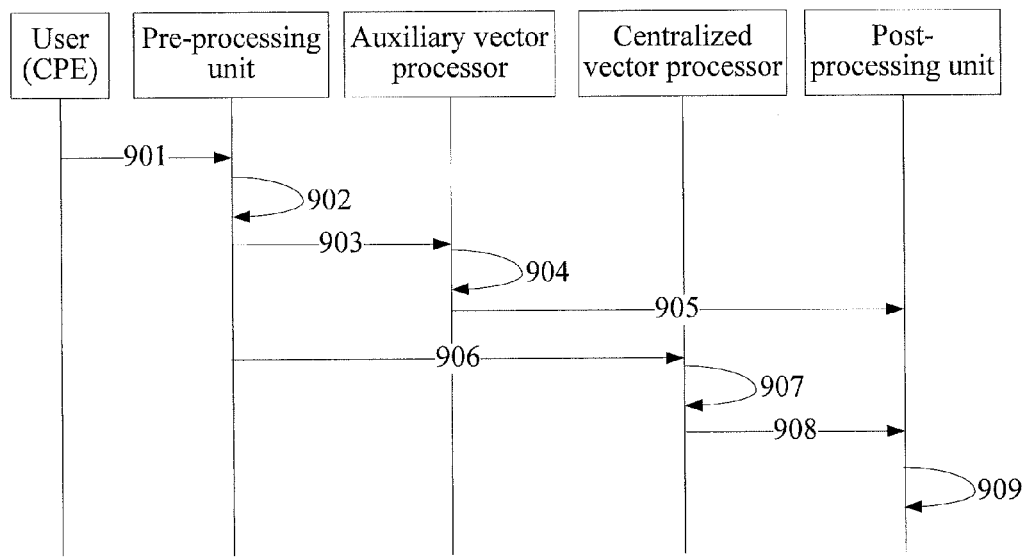
FIG. 9 is a schematic diagram of a vectored-DSL method provided by Embodiment 2 for a situation in which a user transmits uplink data to a CO.

The embodiment of the present invention further describes the vectored-DSL method in detail. A method provided by the embodiment of the present invention is still based on the vectored-DSL system shown in FIG. 6, where the number of boards is N (N≥2), which are a board 1, a board 2, . . . , and a board N; the number of users of each board is n (n≥2), users of the board 1 are $X_1$-$X_n$, users of the board 2 are $X_{n+1}$-$X_{2n}$, . . . , and users of the board N are $X_{(N-1)n+1}$-$X_{Nn}$; and each board includes an auxiliary vector processor. Referring to FIG. 9, for a situation in which a user transmits uplink data to a CO, the method provided by this embodiment includes the following steps:

Step 901: A user sends data thereof to a board where the user is located.

That is to say, the users $X_1$-$X_n$ send data thereof to the board 1, the users $X_{n+1}$-$X_{2n}$ send data thereof to the board 2, . . . , and the users $X_{(N-1)n+1}$-$X_{Nn}$ send data thereof to the board N. Specifically, the data is sent to a pre-processing unit of the board where the user is located.

Step 902: The pre-processing unit on each board pre-processes user data received by the board.

The pre-processing includes performing fast Fourier transform on the received user data. The user data on each board that has undergone the fast Fourier transform may be represented as follows: the data of the users $X_1$-$X_n$ of the board 1 is represented as $\vec{x}_1=\{x_1, x_2, \ldots, x_n\}$ the data of the users $X_{n+1}$-$X_{2n}$ of the board 2 is represented as $\vec{x}_2=\{x_{n+1}, x_{n+2}, \ldots, x_{2n}\}$; and similarly, the data of the users $X_{(N-1)n+1}$-$X_{Nn}$ of the board N is represented as $\vec{x}_N=\{x_{(N-1)n+1}, x_{(N-1)n+2}, \ldots, x_{Nn}\}$.

Step 903: The pre-processing unit of each board transmits the user data of the board to the auxiliary vector processor on the board.

Step 904: The auxiliary vector processor performs internal crosstalk elimination on the user data of the board, so as to obtain internally processed data.

The internal crosstalk elimination is specifically that, the auxiliary vector processor of each board generates an n×n crosstalk elimination matrix W1, the matrix W1 undergoes a matrix multiplication operation with an n×1 column vector formed by the user data of the board, so as to obtain an n×1 column vector used as the internally processed data of the board. It should be noted that the matrix W1 generated by the auxiliary vector processor of each board is generated to eliminate crosstalk between the users of the board, so that the matrix W1 is different for each board.

Step 905: The auxiliary vector processor outputs the internally processed data to a post-processing unit.

Step 906: The pre-processing unit of each board transmits the user data thereof to a centralized vector processor.

Step 907: The centralized vector processor performs external crosstalk elimination on the user data obtained through step 906, so as to obtain externally processed data.

The user data in this step is the data of all users of each board, and may be represented by an Nn×1 column vector.

The external crosstalk elimination is specifically that, the centralized vector processor generates an Nn×Nn crosstalk elimination matrix W2, and it should be noted that, the auxiliary vector processor already processes far-end crosstalk between the users of the board where the auxiliary vector processor is located, so that N n×n square matrices in diagonal locations (locations from upper left to lower right) of the matrix W2 are N zero matrices, and do not participate in the subsequent matrix multiplication operation; the matrix W2 undergoes the matrix multiplication operation with the Nn×1 column vector formed by the user data of each board, so as to obtain an Nn×1 column vector used as the externally processed data.

Step 908: The centralized vector processor returns the obtained externally processed data to the post-processing unit of each board.

It should be noted that steps 903-905 and steps 906-908 may be two processes that are parallel and in no particular order.

Step 909: The post-processing unit of each board receives the externally processed data of the board, and post-processes the externally processed data and the internally processed data.

The post-processing refers to that the post-processing unit of each board adds the internally processed data and the externally processed data of each user of the board, to obtain the user data of the user after the crosstalk elimination is performed; definitely, the post-processing may further include: decoding the user data of each user after the crosstalk elimination is performed.

In the matrix multiplication operation of the centralized vector processor provided by this embodiment, the matrix operation of the N n×n square matrices in the diagonal locations in the matrix W2 is excluded, and the process specifically at most needs to perform $4(N*n)^2-4N*n^2$ multiplication operations and $3(M*n)^2-3N*n^2$ addition operations, thereby reducing an amount of computation of the centralized vector processor when compared with the prior art. In other words, in a situation in which data processing capability of the centralized vector processor remains unchanged, user capacity of the vectored-DSL system may be increased.

It should be noted that the vectored-DSL system shown in FIG. 6 is a preferred solution, so that a vectored-DSL method for the system is provided in this embodiment. For the vectored-DSL system where only a part (at least one) of the boards include the auxiliary vector processor, the aforementioned steps are all implemented only for the user data of at least one board that includes the auxiliary vector processor, but for the user data of the board that does not include the auxiliary vector processor, implementation may be performed by using a method in the prior art, which is therefore not repeated herein; for the vectored-DSL system where only a part (at least one) of the boards include the auxiliary vector processor, the centralized vector processor performs the external vectorization processing on the user data of the board that includes the auxiliary vector processor, and performs the internal vectorization processing and the external vectorization processing on the user data of the board that does not include the auxiliary vector processor; for example, in the vectored-DSL system shown in FIG. 5, the boards that include the auxiliary vector processor are only the board 1 and the board 2, the boards that do not include the auxiliary vector processor are the remaining N-2 boards when the board 1 and the board 2 are excluded, the auxiliary processors of the board 1 and the board 2 perform the internal vectorization processing only on the user data of the boards, the centralized vector processor in the system performs only the external vectorization processing on the user data of the board 1 and the board 2, but performs the internal vectorization processing and the external vectorization processing on the user data of the other N-2 boards. It is easy to obtain that for the vectored-DSL system shown in FIG. 5 where only a part of the boards include the auxiliary vector processor, the centralized vector processor needs to perform multiplication operations being more than $4(N*n)^2-4N*n^2$ and less than $4(N*n)^2$, and needs to perform addition operations being more than $3(N*n)^2-3N*n^2$ and less than $3(N*n)^2-(N*n)$.

Therefore, compared with the prior art, in the vectored-DSL system where at least one board includes the auxiliary vector processor, the auxiliary vector processor may share an amount of data processing of the centralized vector processor, so that in a situation in which the data processing capability of the centralized vector processor remains unchanged, the user capacity of the vectored-DSL system may be increased.

Embodiment 3

In order to decrease the data transmission bandwidth between a board and a centralized vector processor, the embodiment of the present invention further optimizes the solution in Embodiment 2 for the vectored-DSL system shown in FIG. 6. Compared with the solution in Embodiment 2, the solution provided by the present invention further includes step S1 or step S2 before implementation of step 906, so as to obtain a user, which is in strong line-correlation with other boards, on each board, and transmit data of the users to the centralized vector processor, thereby achieving the objective of decreasing the bandwidth.

Step S1 and step S2 are two parallel solutions, and only one of them needs to be selected.

Step S1: Each board selects a user that is on the board and is in strong line-correlation with users of other boards.

This step may be that the board may select a user, which is located on the board and is in strong line-correlation with users of other boards, according to an empirical value or in other manners.

Step S2: The centralized vector processor selects a user, which is in strong line-correlation with users of other boards, on each board.

This step may be that: the centralized vector processor selects a user, which is in strong line-correlation with users of other boards, on each board according to an empirical value or in other manners. If the step is used, each board under control of the centralized vector processor transmits data of the user, which is in strong line-correlation with other boards, on the board to the centralized vector processor for subsequent data processing.

Then, implementation of steps 906-908 is different from that in Embodiment 2, and other steps may be referred to the description in Embodiment 2.

Step 906: Each board transmits data of the user, which is in strong line-correlation with the user on other boards, on the board to the centralized vector processor.

For example, the number of users, which are in strong line-correlation with users of other boards (boards except the board 1), on the board 1 is $n_1$, the board 1 transmits data of the $n_1$ users to the centralized vector processor; the number of users, which are in strong line-correlation with users of other boards (boards except the board 2), on the board 2 is $n_2$ the board 2 transmits data of the $n_2$ users to the centralized vector processor; similarly, the number of users, which are in strong line-correlation with users of other boards (boards except the board N), on the board N is $n_N$, the board N transmits data of the $n_N$ users to the centralized vector processor; and $n_1 \leq n$, $n_2 \leq n, \ldots,$ and $n_N \leq n$.

Therefore, in the vectored-DSL system provided by the embodiment of the present invention, requirements on the bandwidth between each board and the centralized vector processor are as follows:

It is assumed that the number of subcarriers can be used by each user is 4096, signal data of each subcarrier is 32 bits, and a symbol rate is 4000/s, so that the data bandwidth required by each user is $$4096 \times 32 \times 4000 = 524 \text{ Mbits/s}$$

therefore, the data bandwidth required by the board 1 is $m_1 = 524*n_1$ Mbits/s;

the data bandwidth required by the board 2 is $m_2 = 524*n_2$ Mbits/s; and by analogy, the data bandwidth required by the board N is $m_N = 524*n_N$ Mbits/s.

Therefore, for the centralized vector processor, the required ingress bandwidth thereof is $$m_{12} + m_2 + \ldots + m_N = 524*(n_1 + n_2 + \ldots + n_N) \text{Mbits/s}.$$

However, when a centralized vectored-DSL system in the prior art is used, the required ingress bandwidth is $524*N*n$ Mbits/s; when the vectored-DSL system provided by the embodiment of the present invention is compared with the centralized vectored-DSL system in the prior art, since $524*(n_1 + n_2 + \ldots + n_N) \leq 524*N*n$, if only at least one user of any board is not in strong line-correlation with users of other boards, the vectored-DSL system provided by the embodiment of the present invention can use smaller bandwidth than the centralized vectored-DSL system in the prior art.

Step 907: The centralized vector processor performs external vectorization processing on the user data obtained through step 906, so as to obtain externally processed data.

In the embodiment of the present invention, the user data obtained through step 906 is only the data of the user, which is in strong line-correlation with the users of other boards, on each board, so that the number of obtained pieces of user data is smaller than or equal to Nn, and if the number of obtained pieces of user data is smaller than Nn user data that is not obtained is set to 0, so that all user data can still be represented by an Nn×1 column vector.

The external vectorization processing is specifically that, the centralized vector processor generates an Nn×Nn crosstalk elimination matrix W2, and it should be noted that, the auxiliary vector processor already processes far-end crosstalk between the users of the board where the auxiliary vector processor is located, so that N n×n square matrices in diagonal locations (locations from upper left to lower right) of the matrix W2 are N zero matrices, and do not participate in the subsequent matrix multiplication operation; the matrix W2 undergoes the matrix multiplication operation with the Nn×1 column vector formed by the user data of each board, so as to obtain an Nn×1 column vector used as the externally processed data. The user data set to 0 indicates that the user is not in strong line-correlation with any user of other boards, so that during the matrix operation, calculation related to the user data set to 0 may be omitted, so as to reduce an amount of computation of the centralized vector processor on the basis that it is ensured that a final result is not affected.

Step 908: The centralized vector processor returns the obtained externally processed data to the post-processing unit of each board.

This step is specifically that, the centralized vector processor returns the externally processed data not being 0 to the post-processing unit of each board.

The egress bandwidth and the ingress bandwidth of uplink data have the same bandwidth need, which is the same as a beneficial effect of step 906 of the embodiment of the present invention, and using of this step may decrease the data transmission bandwidth between the centralized vector processor and the board.

It should be noted that, for a vectored-DSL system where only a part (at least one) of boards include the auxiliary vector processor, for example, the vectored-DSL system shown in FIG. 5, step S1 is that the board that includes the auxiliary vector processor is further configured to select a user that is on the board and is in strong line-correlation with users of other boards.

For example, for the vectored-DSL system shown in FIG. 5, this step is specifically that the board 1 in the system is further configured to select a user that is on the board 1 and is in strong line-correlation with users of other boards (N−1 boards when the board 1 is excluded), and similarly, the board 2 is further configured to select a user that is on the board 2 and is in strong line-correlation with users of other boards (N−1 boards when the board 2 is excluded).

An objective of this step is to transmit only the data of the user that is on the board that includes the auxiliary vector processor and is in strong line-correlation with the user on other boards to the centralized vector processor, thereby saving the data transmission bandwidth between the board and the centralized vector processor.

Step S2 is that the centralized vector processor is further configured to select a user, which is in strong line-correlation with users of other boards, on each board that includes the auxiliary vector processor.

For example, for the vectored-DSL system shown in FIG. 5, this step is specifically that the centralized vector processor in the system is further configured to select a user that is on the board 1 and is in strong line-correlation with users of other boards (N−1 boards when the board 1 is excluded), and is also configured to select a user that is on the board 2 and is in strong line-correlation with users of other boards (N−1 boards when the board 2 is excluded).

An objective of this step is that the centralized vector processor controls the board, where the selected user is, to transmit user data of the user to the centralized vector processor. That is to say, the centralized vector processor needs to obtain the data of the user that is on the board that includes the auxiliary vector processor and is in strong line-correlation with the user on other boards, thereby saving the data transmission bandwidth between the board and the centralized vector processor to some degree.

Embodiment 4

Figure 10:
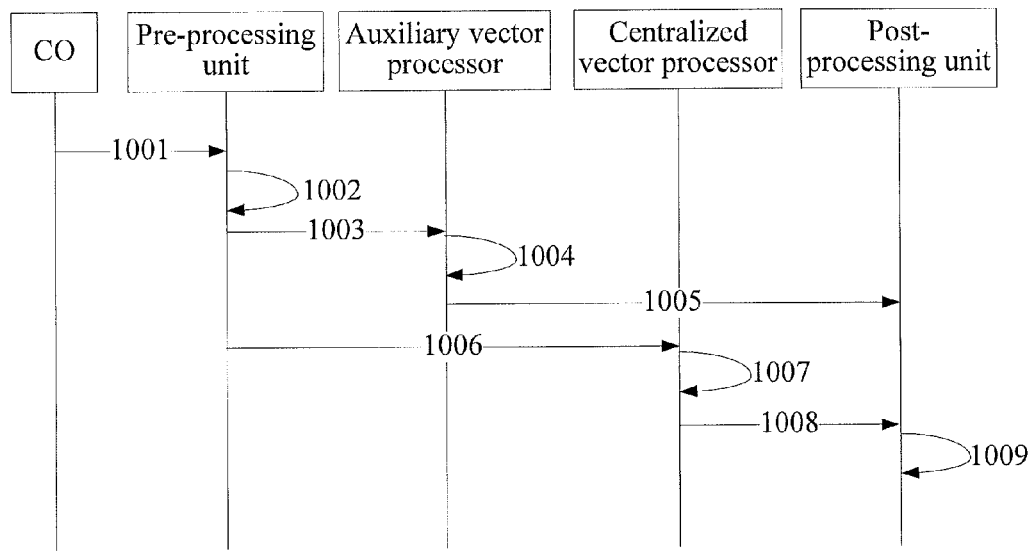
FIG. 10 is a schematic diagram of a vectored-DSL method provided by Embodiment 4 for a situation in which a CO transmits downlink data to a user.

A method provided by the embodiment of the present invention is still based on the vectored-DSL system shown in FIG. 6, where the number of boards is N (N≥2), which are a board 1, a board 2, ..., and a board N; the number of users of each board is n (n≥2), users of the board 1 are $X_1$–$X_n$, users of the board 2 are $X_{n+1}$–$X_{2n}$, ..., and users of the board N are $X_{(N-1)n+1}$–$X_{Nn}$; and each board includes an auxiliary vector processor. Referring to FIG. 10, for a situation in which a CO transmits downlink data to a user, the method provided by this embodiment includes the following steps.

Step 1001: A CO sends data, required to be delivered by the CO to users, to a board where each of the users is located.

That is to say, the CO sends data required to be delivered to the users $X_1$-$X_n$, to the board 1, data required to be delivered to the users $X_{n+1}$-$X_{2n}$ to the board 2, and data required to be delivered to the users $X_{(N-1)n+1}$-$X_{Nn}$ to the board N. Specifically, the data is sent to a pre-processing unit of each board.

Step 1002: The pre-processing unit on each board pre-processes the user data received by the board and sent by the CO.

The pre-processing in this step includes: making, by the pre-processing unit on each board, the user data received by the board undergo coding processing performed by an encoder. The user data, after undergoing the coding processing, may be represented as follows: the data of the users $X_1$-$X_n$ of the board 1 is represented as $\vec{x}_1=\{x_1, x_2, \ldots, x_n\}$; the data of the users $X_{n+1}$-$X_{2n}$ of the board 2 is represented as $\vec{x}_2=\{x_{n+1}, x_{n+2}, \ldots, x_{2n}\}$; and similarly, the data of the users $X_{(N-1)n+1}$-$X_{Nn}$ of the board N is represented as $\vec{x}_N=\{x_{(N-1)n+1}, x_{(N-1)n+2}, \ldots, x_{Nn}\}$.

Step 1003: The pre-processing unit of each board transmits the user data of the board to the auxiliary vector processor on the board.

Step 1004: The auxiliary vector processor performs internal precoding on the user data of the board, so as to obtain internally processed data.

The internal precoding in this step is specifically that, the auxiliary vector processor of each board generates an n×n precoding matrix P1, the matrix P1 undergoes a matrix multiplication operation with an n×1 column vector formed by the user data of the board, so as to obtain an n×1 column vector used as the internally processed data of the board. It should be noted that the matrix P1 generated by the auxiliary vector processor of each board is generated to eliminate crosstalk that may be incurred between the users of the board, so that for each board, the matrix P1 is different.

Step 1005: The auxiliary vector processor outputs the internally processed data to a post-processing unit.

Step 1006: The pre-processing unit of each board transmits the user data thereof to a centralized vector processor.

Step 1007: The centralized vector processor performs external vectorization processing on the user data obtained through step 1006, so as to obtain externally processed data.

The user data in this step is the data of all users of each board, and may be represented by an Nn×1 column vector.

The external precoding is specifically that, the centralized vector processor generates an Nn×Nn precoding matrix P2, and it should be noted that, the auxiliary vector processor already processes far-end crosstalk between the users of the board where the auxiliary vector processor is located, so that N n×n square matrices in diagonal locations (locations from upper left to lower right) of the matrix P2 are N zero matrices, and do not participate in the subsequent matrix multiplication operation; the matrix P2 undergoes the matrix multiplication operation with the Nn×1 column vector formed by the user data of each board, so as to obtain an Nn×1 column vector used as the externally processed data.

Step 1008: The centralized vector processor returns the obtained externally processed data to the post-processing unit of each board.

It should be noted that steps 1003-1005 and steps 1006-1008 may be two processes that are parallel and in no particular order.

Step 1009: The post-processing unit of each board receives the externally processed data of the board, and post-processes the externally processed data and the internally processed data.

The post-processing in this step refers to that the post-processing unit of each board adds the internally processed data and the externally processed data of each user of the board, to obtain the user data of the user after the precoding is performed; definitely, the post-processing may further include: performing inverse Fourier transform on the user data of each user after the precoding is performed, and then sending the user data to each user.

In the matrix multiplication operation of the centralized vector processor provided by this embodiment, the matrix operation of the N n×n square matrices in the diagonal locations in the matrix P2 is excluded, and the process specifically at most needs to perform $4(N*n)^2-4N*n^2$ multiplication operations and $3(N*n)^2-3N*n^2$ addition operations, thereby reducing an amount of computation of the centralized vector processor when compared with the prior art. In other words, in a situation in which data processing capability of the centralized vector processor remains unchanged, user capacity of the vectored-DSL system may be increased.

It should be noted that, for the vectored-DSL system shown in FIG. 5 where only a part (at least one) of the boards include the auxiliary vector processor, the aforementioned steps are all implemented only for the user data of at least one board that includes the auxiliary vector processor, but for the user data of the board that does not include the auxiliary vector processor, implementation may be performed by using a method in the prior art, which is therefore not repeated herein.

Embodiment 5

In order to decrease the data transmission bandwidth between a board and a centralized vector processor, the embodiment of the present invention further optimizes the solution in Embodiment 4 for the vectored-DSL system shown in FIG. 6. Compared with the solution in Embodiment 4, the solution provided by the present invention further includes step Q1 or step Q2 before implementation of step 1006, so as to obtain a user, which is in strong line-correlation with other boards, on each board, and transmit data of the users to the centralized vector processor, thereby achieving the objective of decreasing the bandwidth.

Step Q1 and step Q2 are two parallel solutions, and only one of them needs to be selected.

Step Q1: Each board selects a user that is on the board and is in strong line-correlation with users of other boards.

In this step, the board may select a user, which is located on the board and is in strong line-correlation with users of other boards, according to an empirical value or in other manners.

Step Q2: The centralized vector processor selects a user, which is in strong line-correlation with users of other boards, on each board.

This step may be that: the centralized vector processor selects a user, which is in strong line-correlation with users of other boards, on each board according to an empirical value or in other manners. If the step is used, each board under control of the centralized vector processor transmits data of the user, which is in strong line-correlation with other boards, on the board to the centralized vector processor for subsequent data processing.

Then, implementation of steps 1006-1008 is different from that in Embodiment 4, and other steps may be referred to the description in Embodiment 4.

Step 1006: Each board transmits data of the user, which is in strong line-correlation with the user on other boards, on the board to the centralized vector processor.

For example, the number of users, which are in strong line-correlation with users of other boards (boards except the board 1), on the board 1 is $n_1$, the board 1 transmits data of the $n_1$ users to the centralized vector processor; the number of users, which are in strong line-correlation with users of other boards (boards except the board 2), on the board 2 is $n_2$, the board 2 transmits data of the $n_2$ users to the centralized vector processor; similarly, the number of users, which are in strong line-correlation with users of other boards (boards except the board N), on the board N is $n_N$, the board N transmits data of the $n_N$ users to the centralized vector processor; and $n_1 \leq n$, $n_2 \leq n, \ldots,$ and $n_N \leq N$.

In the vectored-DSL system provided by the embodiment of the present invention, the bandwidth between each board and the centralized vector processor is required to be, obtained with reference the calculation method in Embodiment 3, $$m_1+m_2+\ldots+m_N=524*(n_1+n_2+\ldots+n_N)\text{Mbits/s}.$$

However, when a centralized vectored-DSL system in the prior art is used, the ingress bandwidth required by downlink data is $524*N*n$ Mbits/s; when the vectored-DSL system provided by the embodiment of the present invention is compared with the centralized vectored-DSL system in the prior art, since $524*(n_1+n_2+\ldots+n_N) \leq 524*N*n$, if only at least one user of any board is not in strong line-correlation with users of other boards, the vectored-DSL system provided by the embodiment of the present invention can use smaller bandwidth than the centralized vectored-DSL system in the prior art.

Step 1007: The centralized vector processor performs external vectorization processing on the user data obtained through step 1006, so as to obtain externally processed data.

In the embodiment of the present invention, the user data obtained through step 1006 is only the data of the user, which is in strong line-correlation with the users of other boards, on each board, so that the number of obtained pieces of user data is smaller than or equal to Nn, and if the number of obtained pieces of user data is smaller than Nn, user data that is not obtained is set to 0, so that all user data can still be represented by an Nn×1 column vector.

The external vectorization processing is specifically that, the centralized vector processor generates an Nn×Nn crosstalk elimination matrix P2, and it should be noted that, the auxiliary vector processor already processes far-end crosstalk between the users of the board where the auxiliary vector processor is located, so that N n×n square matrices in diagonal locations (locations from upper left to lower right) of the matrix P2 are N zero matrices, and do not participate in the subsequent matrix multiplication operation; the matrix P2 undergoes the matrix multiplication operation with the Nn×1 column vector formed by the user data of each board, so as to obtain an Nn×1 column vector used as the externally processed data. The user data set to 0 indicates that the user is not in strong line-correlation with any user of other boards, so that during the matrix operation, calculation related to the user data set to 0 may be omitted, so as to reduce an amount of computation of the centralized vector processor on the basis that it is ensured that a final result is not affected.

Step 1008: The centralized vector processor returns the obtained externally processed data to the post-processing unit of each board.

This step may specifically be that, the centralized vector processor returns the externally processed data not being 0 to the post-processing unit of each board.

The egress bandwidth and the ingress bandwidth of downlink data have the same bandwidth need, which is the same as a beneficial effect of step 1006 of the embodiment of the present invention, and using of this step may decrease the data transmission bandwidth between the centralized vector processor and the board.

It should be noted that, for a vectored-DSL system shown in, for example, FIG. 5, where only a part (at least one) of boards include the auxiliary vector processor, step Q1 is that the board that includes the auxiliary vector processor is further configured to select a user that is on the board and is in strong line-correlation with users of other boards.

Step Q2 is that the centralized vector processor is further configured to select a user, which is in strong line-correlation with users of other boards, on each board that includes the auxiliary vector processor.

Similarly, for a vectored-DSL system where only a part (at least one) of boards include the auxiliary vector processor, the data transmission bandwidth between the board and the centralized vector processor can also be decreased.

Embodiment 6

Figure 11:
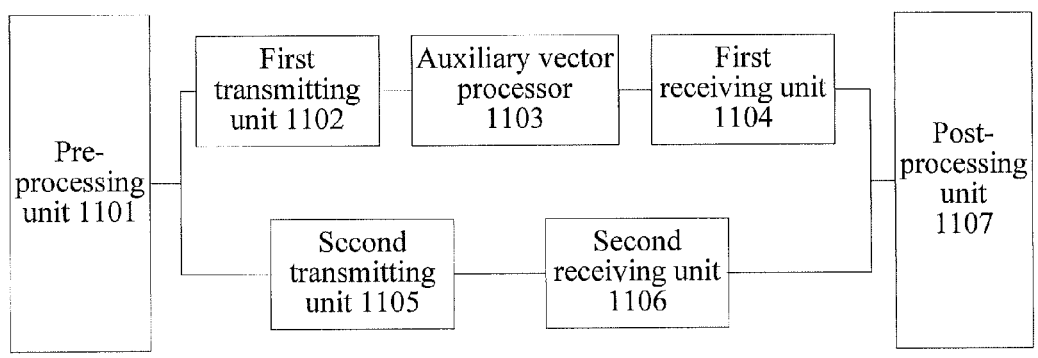
FIG. 11 is a structural block diagram of a board provided by Embodiment 6.

As shown in FIG. 11, the embodiment of the present invention further provides a board applied to the vectored-DSL system shown in FIG. 5 or FIG. 6, and the board includes:

a pre-processing unit 1101, configured to receive and pre-process user data of the board;

a first transmitting unit 1102, configured to transmit the user data of the board to an auxiliary vector processor on the board;

an auxiliary vector processor 1103, configured to perform internal vectorization processing on the user data of the board and output internally processed data;

a first receiving unit 1104, configured to receive the internally processed data output by the auxiliary vector processor;

a second transmitting unit 1105, configured to transmit the user data of the board to a centralized vector processor to perform external vectorization processing;

a second receiving unit 1106, configured to receive externally processed data output after the centralized vector processor performs the external vectorization processing; and a post-processing unit 1107, configured to post-process the internally processed data from the first receiving unit and the externally processed data from the second receiving unit.

A structural block diagram of the board shown in FIG. 11 is only applied to a board 1 and a board 2 of the vectored-DSL system shown in FIG. 5; and is applied to all N boards in the vectored-DSL system shown in FIG. 6.

The vectorization processing includes precoding and/or crosstalk elimination. In a situation in which a user transmits uplink data to a CO, the vectorization processing refers to crosstalk elimination; in a situation in which a CO transmits downlink data to a user, the vectorization processing refers to precoding. That is to say, the board may be only for uplink or only for downlink, and definitely may be not only for uplink but also for downlink (in the situation in which the user transmits uplink data to the CO, the board is for uplink; in the situation in which the CO transmits downlink data to the user, the board is for downlink).

The centralized vector processor may be integrated on the board, or the centralized vector processor is independent of the board and exists separately.

Figure 12:
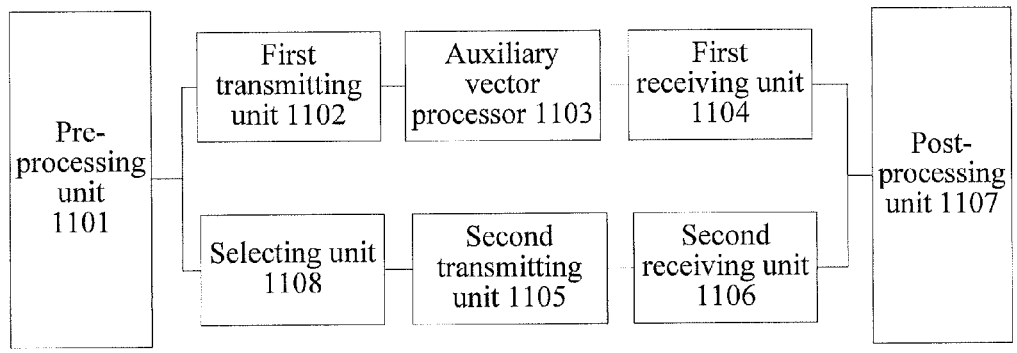
FIG. 12 is a structural block diagram of another board provided by Embodiment 6.

Further, the board shown in FIG. 12 may further include:

a selecting unit 1108, configured to select a user that is on the board and is in strong line-correlation with users of other boards.

In this case, the second transmitting unit 1105 is specifically configured to transmit data of the user that is on the board and is in strong line-correlation with the user on other boards to the centralized vector processor to perform the external vectorization processing.

The second receiving unit 1106 is specifically configured to receive externally processed data output after the centralized vector processor performs the external vectorization processing on the data of the user that is on the board and is in strong line-correlation with the user on other boards.

In the board provided by the embodiment of the present invention, the auxiliary vector processor shares a partial amount of data processing, so that in a situation in which the number of system users remains unchanged, an amount of data processing of the centralized vector processor may be decreased, and in a situation in which data processing capability of the centralized vector processor remains unchanged, user capacity of the vectored-DSL system may be increased; definitely, if the data processing capability of the centralized vector processor can be improved, application of the solution provided by the present invention may further increase the user capacity of the vectored-DSL system.

Embodiment 7

The embodiment of the present invention further provides a DSLAM device, the device includes at least two boards, and at least one of the boards, as shown in FIG. 11, includes:

a pre-processing unit 1101, configured to receive and pre-process user data of the board;

a first transmitting unit 1102, configured to transmit the user data of the board to an auxiliary vector processor on the board;

an auxiliary vector processor 1103, configured to perform internal vectorization processing on the user data of the board and output internally processed data;

a first receiving unit 1104, configured to receive the internally processed data output by the auxiliary vector processor;

a second transmitting unit 1105, configured to transmit the user data of the board to a centralized vector processor to perform external vectorization processing;

a second receiving unit 1106, configured to receive externally processed data output after the centralized vector processor performs the external vectorization processing; and a post-processing unit 1107, configured to post-process the internally processed data from the first receiving unit and the externally processed data from the second receiving unit.

For example, on a DSLAM device of the vectored-DSL system shown in FIG. 5, a structural block diagram of only a board 1 and a board 2 can be referred to FIG. 11, and the other boards are the same as or similar to a board that does not include an auxiliary vector processor in the prior art, which are not described herein again; on a DSLAM device of a vectored-DSL system shown in FIG. 6, a structural block diagram of all N boards may be referred to FIG. 11.

Further, the board, as shown in FIG. 12, may further include:

a selecting unit 1108, configured to select a user that is on the board and is in strong line-correlation with users of other boards.

In this case, the second transmitting unit 1105 is specifically configured to transmit data of the user that is on the board and is in strong line-correlation with the user on other boards to the centralized vector processor to perform the external vectorization processing.

The second receiving unit 1106 is specifically configured to receive externally processed data output after the centralized vector processor performs the external vectorization processing on the data of the user that is on the board and is in strong line-correlation with the user on other boards.

In the DSLAM device of the vectored-DSL system shown in FIG. 5, the centralized vector processor is configured to perform the external vectorization processing on the user data of the board that includes the auxiliary vector processor, and perform the internal vectorization processing and the external vectorization processing on user data of a board that does not include the auxiliary vector processor.

In the board, including the auxiliary vector processor, in the DSLAM device provided by the embodiment of the present invention, the auxiliary vector processor shares a partial amount of data processing, so that in a situation in which the number of system users remains unchanged, an amount of data processing of the centralized vector processor may be decreased, and in a situation in which data processing capability of the centralized vector processor remains unchanged, user capacity of the vectored-DSL system may be increased; definitely, if the data processing capability of the centralized vector processor can be improved, application of the solution provided by the present invention may further increase the user capacity of the vectored-DSL system.

Through the foregoing description of the embodiments, it is apparent to persons skilled in the art that the present invention may be implemented by software plus necessary universal hardware, and definitely may also be implemented by hardware, but in most cases, the present invention is preferably implemented through the former method. Based on this, the technical solutions of the present invention or the part that makes contributions to the prior art can be embodied in the form of a software product based on the hardware architecture of the vectored-DSL system. The computer software product is stored in a readable storage medium, for example, a floppy disk, hard disk, or optical disk of the computer, and contains several instructions used to instruct a computer device (for example, a personal computer, a server, or a network device) to perform the methods according to the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A vectored-DSL method, comprising:
   receiving, by at least one board, and pre-processing user data of the board;
   transmitting, by the board, the user data of the board to an auxiliary vector processor on the board to perform internal vectorization processing, so as to obtain internally processed data, wherein the performing of internal vectorization processing comprises: when the user data is transmitted by a user to a central office, CO, of a vectored-DSL system, performing crosstalk elimination by the auxiliary vector processor to eliminate crosstalk incurred between users on the board;
   transmitting, by the board, the user data of the board to a centralized vector processor to perform external vectorization processing, so as to obtain externally processed data, wherein the performing of external vectorization processing comprises: when the user data is transmitted by a user to the CO, performing crosstalk elimination by the centralized vector processor to eliminate crosstalk incurred between a user of each board and users of other boards; and receiving, by the board, the externally processed data of the board, and post-processing the externally processed data and the internally processed data.

2. The method according to claim 1, wherein before the transmitting, by the board, the user data thereof to a centralized vector processor to perform external vectorization processing to obtain externally processed data, the method further comprises:

selecting, by the board, a user that is on the board and is in strong line-correlation with users of one or more other boards; or selecting, by the centralized vector processor, a user that is on the board and is in strong line-correlation with users of other boards; and the transmitting, by the board, the user data thereof to a centralized vector processor to perform external vectorization processing to obtain externally processed data is:

transmitting, by the board, data of the user that is on the board and is in strong line-correlation with the users on the one or more other boards to the centralized vector processor to perform the external vectorization processing to obtain the externally processed data.

3. The vectored-DSL method according to claim 1, wherein the vectorization processing comprises precoding and/or crosstalk elimination.

4. A board, comprising:

a pre-processing unit, configured to receive and pre-process user data of the board;

a first transmitting unit, configured to transmit the user data of the board to an auxiliary vector processor on the board;

the auxiliary vector processor, configured to perform internal vectorization processing on the user data of the board and output internally processed data, wherein the performing of internal vectorization processing comprises: when the user data is transmitted by a user to a central office, CO, of a vectored-DSL system, performing crosstalk elimination by the auxiliary vector processor to eliminate crosstalk incurred between users on the board;

a first receiving unit, configured to receive the internally processed data output by the auxiliary vector processor;

a second transmitting unit, configured to transmit the user data of the board to a centralized vector processor to perform external vectorization processing, wherein the performing of external vectorization processing comprises: when the user data is transmitted by a user to the CO, performing crosstalk elimination by the centralized vector processor to eliminate crosstalk incurred between a user of each board and users of other boards;

a second receiving unit, configured to receive externally processed data output after the centralized vector processor performs the external vectorization processing; and a post-processing unit, configured to post-process the internally processed data from the first receiving unit and the externally processed data from the second receiving unit.

5. The board according to claim 4, further comprising:

a selecting unit, configured to select a user that is on the board and is in strong line-correlation with users of one or more other boards; wherein the second transmitting unit is specifically configured to transmit data of the user that is on the board and is in strong line-correlation with the users on the one or more other boards to the centralized vector processor to perform the external vectorization processing; and the second receiving unit is specifically configured to receive externally processed data output after the centralized vector processor performs the external vectorization processing on the data of the user that is on the board and is in strong line-correlation with the users on the one or more other boards.

6. A digital subscriber line access multiplexer DSLAM device, comprising at least two boards, wherein at least one board comprises:

a pre-processing unit, configured to receive and pre-process user data of the board;

a first transmitting unit, configured to transmit the user data of the board to an auxiliary vector processor on the board;

the auxiliary vector processor, configured to perform internal vectorization processing on the user data of the board and output internally processed data, wherein the performing of internal vectorization processing comprises: when the user data is transmitted by a user to a central office, CO, of a vectored-DSL system, performing crosstalk elimination by the auxiliary vector processor to eliminate crosstalk incurred between users on the board;

a first receiving unit, configured to receive the internally processed data output by the auxiliary vector processor;

a second transmitting unit, configured to transmit the user data of the board to a centralized vector processor to perform external vectorization processing, wherein the performing of external vectorization processing comprises: when the user data is transmitted by a user to the CO, performing crosstalk elimination by the centralized vector processor to eliminate crosstalk incurred between a user of each board and users of other boards;

a second receiving unit, configured to receive externally processed data output after the centralized vector processor performs the external vectorization processing; and a post-processing unit, configured to post-process the internally processed data from the first receiving unit and the externally processed data from the second receiving unit.

7. The DSLAM device according to claim 6, wherein the board further comprises: a selecting unit, configured to select a user that is on the board and is in strong line-correlation with users of one or more other boards;

the second transmitting unit is specifically configured to transmit data of the user that is on the board and is in strong line-correlation with the user on other boards to the centralized vector processor to perform the external vectorization processing; and the second receiving unit is specifically configured to receive externally processed data output after the centralized vector processor performs the external vectorization processing on the data of the user that is on the board and is in strong line-correlation with the users on the one or more other boards.

8. The DSLAM device according to claim 6, further comprising:

a centralized vector processor, configured to perform the external vectorization processing on the user data of the board that comprises the auxiliary vector processor, and perform the internal vectorization processing and the external vectorization processing on user data of the board that does not comprise the auxiliary vector processor.

9. A vectored-DSL system, comprising:
a DSLAM device comprising at least two boards, at least one of the boards comprises an auxiliary vector processor, the auxiliary vector processor is configured to perform internal vectorization processing on user data of the board where the auxiliary vector processor is located, and the user data of the board comprising the auxiliary processor undergoes external vectorization processing performed by a centralized vector processor, wherein the performing of internal vectorization processing comprises: when the user data is transmitted by a user to a central office, CO, of a vectored-DSL system, performing crosstalk elimination by the auxiliary vector processor to eliminate crosstalk incurred between users on the board, and the performing of external vectorization processing comprises: when the user data is transmitted by a user to the CO, performing crosstalk elimination by the centralized vector processor to eliminate crosstalk incurred between a user of each board and users of other boards; and the centralized vector processor is configured to perform the external vectorization processing on the user data of the board that comprises the auxiliary vector processor, and perform the internal vectorization processing and the external vectorization processing on user data of the board that does not comprise the auxiliary vector processor.

10. The vectored-DSL system according to claim 9, wherein the board that comprises the auxiliary vector processor is further configured to select a user that is on the board and is in strong line-correlation with users of one or more other boards, and transmit data of the user that is on the board and is in strong line-correlation with the users on the one or more other boards to the centralized vector processor.

11. The vectored-DSL system according to claim 9, wherein the centralized vector processor is further configured to select a user, which is in strong line-correlation with users of one or more other boards, on each board that comprises the auxiliary vector processor, and control the board where the user is located to transmit user data of the user to the centralized vector processor.

12. The vectored-DSL system according to claim 9, wherein the centralized vector processor is disposed in the DSLAM device, or is independent of the DSLAM device.

13. An apparatus, comprising:
a pre-processing unit configured to pre-process user data;
a first transmitting unit configured to transmit the user data;
an auxiliary vector processor, configured to receive the transmitted user data and to perform internal vectorization processing on the user data and output internally processed data, wherein the performing of internal vectorization processing comprises: when the user data is transmitted by a user to a central office, CO, of a vectored-DSL system, performing crosstalk elimination by the auxiliary vector processor to eliminate crosstalk incurred between users on the same board;
a first receiving unit, configured to receive the internally processed data output by the auxiliary vector processor;
a second transmitting unit, configured to transmit the user data to a centralized vector processor to perform external vectorization processing, wherein the performing of external vectorization processing comprises: when the user data is transmitted by a user to the CO, performing crosstalk elimination by the centralized vector processor to eliminate crosstalk incurred between a user of each board and users of other boards;
a second receiving unit, configured to receive externally processed data output after the centralized vector processor performs the external vectorization processing; and
a post-processing unit, configured to post-process the internally processed data from the first receiving unit and the externally processed data from the second receiving unit.

* * * * *